US010612920B2

(12) United States Patent
Morioka

(10) Patent No.: US 10,612,920 B2
(45) Date of Patent: Apr. 7, 2020

(54) TELECOMMUNICATIONS APPARATUS AND METHODS

(71) Applicant: SONY CORPORATION, Tokyo (JP)

(72) Inventor: Yuichi Morioka, Basingstoke (GB)

(73) Assignee: SONY CORPORATION, Tokyo (JP)

(*) Notice: Subject to any disclaimer, the term of this patent is extended or adjusted under 35 U.S.C. 154(b) by 383 days.

(21) Appl. No.: 15/501,114

(22) PCT Filed: Aug. 6, 2015

(86) PCT No.: PCT/EP2015/068149
§ 371 (c)(1),
(2) Date: Feb. 1, 2017

(87) PCT Pub. No.: WO2016/023813
PCT Pub. Date: Feb. 18, 2016

(65) Prior Publication Data
US 2017/0219342 A1 Aug. 3, 2017

(30) Foreign Application Priority Data
Aug. 15, 2014 (EP) ..................................... 14181189

(51) Int. Cl.
H04W 4/02 (2018.01)
G01C 5/06 (2006.01)

(52) U.S. Cl.
CPC .............. G01C 5/06 (2013.01); H04W 4/025 (2013.01)

(58) Field of Classification Search
CPC ................. G01C 5/06; H04W 4/025
See application file for complete search history.

(56) References Cited

U.S. PATENT DOCUMENTS

| 6,518,918 B1 | 2/2003 | Vannucci et al. |
| 2009/0286556 A1 | 11/2009 | Yumoto et al. |
| 2012/0013475 A1 | 1/2012 | Farley et al. |

(Continued)

OTHER PUBLICATIONS

Office Action dated Mar. 13, 2018 in corresponding European Patent Application No. 15 750 338.4, 6 pages.
Office Action and Search Report issued in Chinese Application 2015800437001 dated Sep. 29, 2018.
International Search Report dated Oct. 23, 2015 in PCT/EP2015/068149 filed Aug. 6, 2015.

(Continued)

Primary Examiner — David J Bolduc
(74) Attorney, Agent, or Firm — Xsensus LLP

(57) ABSTRACT

Methods and apparatus for determining an altitude for a terminal device operating in a wireless telecommunications network including the terminal device and another network entity. The terminal device measures an indication of barometric pressure in its vicinity using a barometric sensor. The other network entity establishes calibration information, for the barometric pressure measurement, including a reference barometric pressure for a reference altitude and may come from a barometric pressure measurement at the other network entity or from meteorological data provided to the other network entity. The altitude relative to the reference altitude may then be determined from the difference between the barometric pressure measured by the terminal device and the reference barometric pressure, by the terminal device after receiving the calibration information from the other network entity and/or by the other network entity after receiving an indication of the barometric pressure measured by the terminal device.

22 Claims, 6 Drawing Sheets

(56) References Cited

U.S. PATENT DOCUMENTS

| | | | |
|---|---|---|---|
| 2012/0265373 A1 | 10/2012 | Ingvalson et al. | |
| 2014/0135040 A1* | 5/2014 | Edge | H04W 4/025 455/456.6 |
| 2014/0200846 A1 | 7/2014 | Wachter et al. | |
| 2015/0133145 A1* | 5/2015 | Palanki | H04W 4/025 455/456.1 |
| 2015/0247917 A1* | 9/2015 | Gum | H04W 4/029 342/452 |
| 2016/0033286 A1* | 2/2016 | Gemelli | H04W 76/10 701/467 |
| 2016/0047649 A1* | 2/2016 | Edge | H04W 4/025 455/73 |
| 2016/0084936 A1* | 3/2016 | Smith | H04W 4/029 455/456.1 |
| 2016/0234645 A1* | 8/2016 | Belghoul | G01C 5/06 |

OTHER PUBLICATIONS

"Wireless E911 Location Accuracy Requirements, PS Docket No. 07-114" FCC publication FCC-14-13 [https://apps.fcc.gov/edocs_public/attachmatch/FCC-14-13A1.pdf], Feb. 2014, 95 Pages.

Harri Holma, et al., "LTE for UMTS OFDMA and SC-FDMA Based Radio Access" John Wiley and Sons, 2009, 4 Pages.

"BMP180 Digital, barometric pressure sensor" Bosch Sensortec, May 2011, 2 Pages.

"BMP280 Digital, barometric pressure sensor" Bosch Sensortec, Sep. 2012, 2 pages.

"BME280 Integrated Environmental Unit" Bosch Sensortec, Dec. 2013, 2 Pages.

Office Action dated Nov. 8, 2019, issued in corresponding Chinese Application No. 201580043700.1, 11 pages with English Translation.

* cited by examiner

TELECOMMUNICATIONS APPARATUS AND METHODS

CROSS-REFERENCE TO RELATED APPLICATIONS

The present application is based on PCT filing PCT/EP2015/068149 filed Aug. 6, 2015, and claims priority to European Patent Application 14 181 189.3, filed in the European Patent Office on Aug. 15, 2014, the entire contents of each of which being incorporated herein by reference.

BACKGROUND

Field

The present disclosure relates to telecommunications apparatus and methods. In particular, certain embodiments relate to apparatus and methods for determining the height (i.e. altitude/elevation) of a terminal device operating in a wireless telecommunications system.

Description of Related Art

The "background" description provided herein is for the purpose of generally presenting the context of the disclosure. Work of the presently named inventor, to the extent it is described in this background section, as well as aspects of the description which may not otherwise qualify as prior art at the time of filing, are neither expressly or impliedly admitted as prior art against the present invention.

Mobile communication systems have evolved over the past ten years or so from the GSM System (Global System for Mobile communications) to the 3G system and now include packet data communications as well as circuit switched communications. The third generation partnership project (3GPP) has developed a fourth generation mobile communication system referred to as Long Term Evolution (LTE) in which a core network part has been evolved to form a more simplified architecture based on a merging of components of earlier mobile radio network architectures and a radio access interface which is based on Orthogonal Frequency Division Multiplexing (OFDM) on the downlink and Single Carrier Frequency Division Multiple Access (SC-FDMA) on the uplink. Further developments to LTE-based systems are being made in the context of so-called Long Term Evolution-Advanced (LTE-A) architectures.

Newer generations of mobile telecommunication systems, such as those based on the 3GPP defined UMTS and Long Term Evolution (LTE) (including LTE-A) architectures are able to support more sophisticated services than simple voice and messaging services offered by previous generations of mobile telecommunication systems. This has led to the development of terminal devices, such as so-called smart phones, that are able to provide functionality that goes beyond simple voice and messaging services. One aspect of terminal devices that is becoming more and more common is the ability for terminal devices to determine their own location, for example using satellite-based positioning systems, such as the Global Positioning Satellite (GPS) system. Other satellite-based positioning systems could be used, such as the Galileo system and the Global Navigation Satellite System (GLONASS).

There have been proposals to make use of terminal device's ability to establish and report its location for various purposes, for example to help locate a lost telephone or to help emergency responders locate a person needing assistance. With this in mind, in the United States of America the Federal Communications Commission (FCC) has issued a proposal to the mobile industry to seek to provide schemes for locating terminal devices with sufficient accuracy to allow emergency responders to more reliably locate a terminal device in a building (see FCC publication FCC-14-13, Wireless E911 Location Accuracy Requirements, Adopted: Feb. 20, 2014 Released: Feb. 21, 2014—https://apps.fcc.gov/edocs_public/attachmatch/FCC-14-13A1.pdf [1]).

It may be expected existing schemes for determining a terminal device's location, for example using a GPS receiver in the terminal device (potentially with assistance from other positioning technologies, such as Wi-Fi and/or cellular positioning techniques using so-called assisted GPS), may already be able to provide a desired level of positioning accuracy in horizontal dimensions (i.e. to provide a 2D position, e.g. in terms of latitude and longitude). However, it is well recognized that GPS-based receivers are typically less accurate when providing height information. This is basically because a GPS receiver can only receive signals from satellites above the horizon, whereas for each direction in the horizontal plane they can receive signalling from satellites located to both sides of the receiver. Consequently, it can be expected that existing schemes for determining a terminal device's position may be unable to determine the location of a terminal device with sufficient vertical accuracy to allow the floor of a building in which the terminal device is located to be reliably determined. The issue of reduced vertical accuracy as compared to horizontal accuracy is especially significant in the context of seeking to determine on which floor of a building a terminal device is located because GPS-based receivers generally work less well in buildings due to increased signal penetration losses. Furthermore, the consequence of an inaccurate height determination will often be more significant than an inaccurate horizontal position because it will generally take an emergency responder more time to move from one floor to another floor when it is realised there is an error in vertical determination than to move from one room to another room on the same floor when there is an error in horizontal determination.

In view of these issues there is a need for improved schemes for determining the height (vertical location) of a terminal device operating in a wireless telecommunications system.

SUMMARY

According to a first aspect of the present disclosure, there is provided a method of determining an altitude of a terminal device operating in a wireless telecommunications network comprising the terminal device, and another network entity, the method comprising: measuring, by the terminal device, an indication of barometric pressure in the vicinity of the terminal device; establishing, at the other network entity, calibration information for the indication of barometric pressure measured at the terminal device; and determining the altitude of the terminal device from the indication of barometric pressure measured by the terminal device and the calibration information established at the other network entity.

According to a second aspect of the present disclosure, there is provided a wireless telecommunications network, comprising: a terminal device configured to measure an indication of barometric pressure at the terminal device; and another network entity configured to establish calibration information for the indication of barometric pressure measured at the terminal device, wherein at least one of the terminal device and the other network entity is configured to determine an indication of an altitude of the terminal device from the indication of barometric pressure measured at the terminal device and the calibration information established at the other network entity.

According to a third aspect of the present disclosure, there is provided a method of operating a terminal device in a wireless telecommunications network to determine an altitude for the terminal device; the method comprising: measuring an indication of barometric pressure at the terminal device; receiving calibration information for the indication of barometric pressure measured at the terminal device from another network entity; and determining the altitude of the terminal device from the indication of barometric pressure measured at the terminal device and the calibration information received from the other network entity.

According to a fourth aspect of the present disclosure, there is provided a terminal device comprising: a pressure sensor configured to measure an indication of barometric pressure; a transceiver unit configured to receive calibration information for the indication of barometric pressure measured by the terminal device from another network entity; and a controller unit configured to determine an indication of an altitude of the terminal device from the indication of barometric pressure measured by the terminal device and the calibration information received from the other network entity.

According to a fifth aspect of the present disclosure, there is provided circuitry for a terminal device comprising a controller element and a transceiver element configured to operate together to: obtain an indication of a measurement of barometric pressure made by the terminal device; receive calibration information for the indication of the measurement of barometric pressure made by the terminal device from another network entity; and determine an indication of an altitude of the terminal device from the indication of a measurement of barometric pressure made by the terminal device and the calibration information received from the other network entity.

According to a sixth aspect of the present disclosure, there is provided a method of operating a base station in a wireless telecommunications network to determine an altitude for a terminal device; the method comprising: receiving from the terminal device an indication of a measurement of barometric pressure made by the terminal device; establishing calibration information for the indication of the measurement of barometric pressure made by the terminal device; and determining an indication of an altitude of the terminal device from the indication of the measurement of barometric pressure made by the terminal device and the calibration information established by the base station.

According to a seventh aspect of the present disclosure, there is provided a base station comprising: a transceiver unit configured to receive from a terminal device an indication of a measurement of barometric pressure made by the terminal device; a calibration information generation unit configured to establish calibration information for the indication of the measurement of barometric pressure made by the terminal device; and a controller unit configured to determine an indication of an altitude of the terminal device from the indication of the measurement of barometric pressure made by the terminal device and the calibration information established by the base station.

According to an eighth aspect of the present disclosure, there is provided circuitry for a base station comprising a controller element and a transceiver element configured to operate together to: receive from the terminal device an indication of a measurement of barometric pressure made by the terminal device; establish calibration information for the indication of the measurement of barometric pressure made by the terminal device; and determine an indication of an altitude of the terminal device from the indication of the measurement of barometric pressure made by the terminal device and the calibration information established by the base station.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
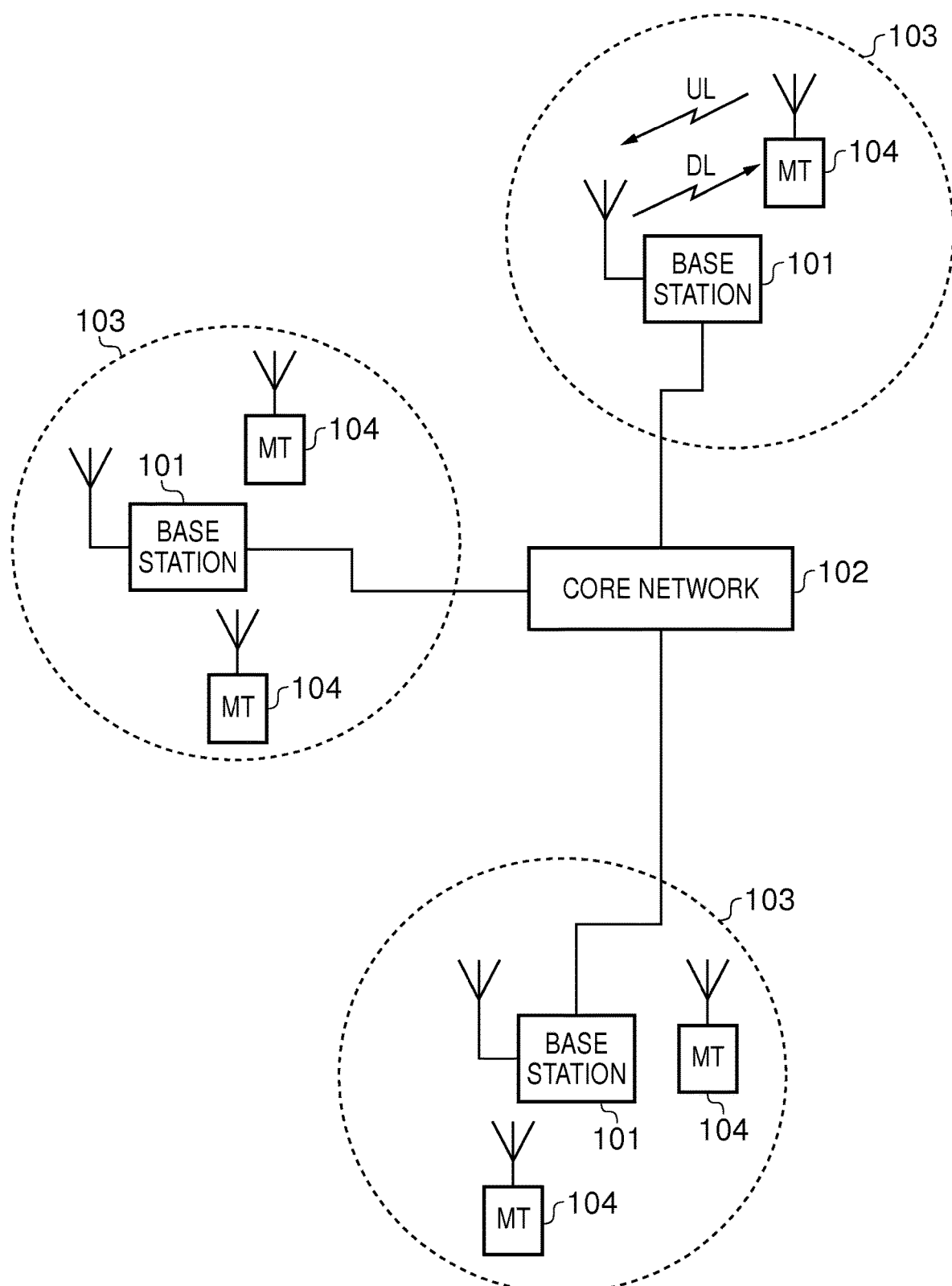
FIG. 1 provides a schematic diagram illustrating an example of a mobile telecommunication system.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP (RTM) body and also described in many books on the subject, for example, Holma H. and Toskala A [2]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, and so forth. Base stations may also be referred to as transceiver stations/nodeBs/e-nodeBs, and so forth.

Figure 2:
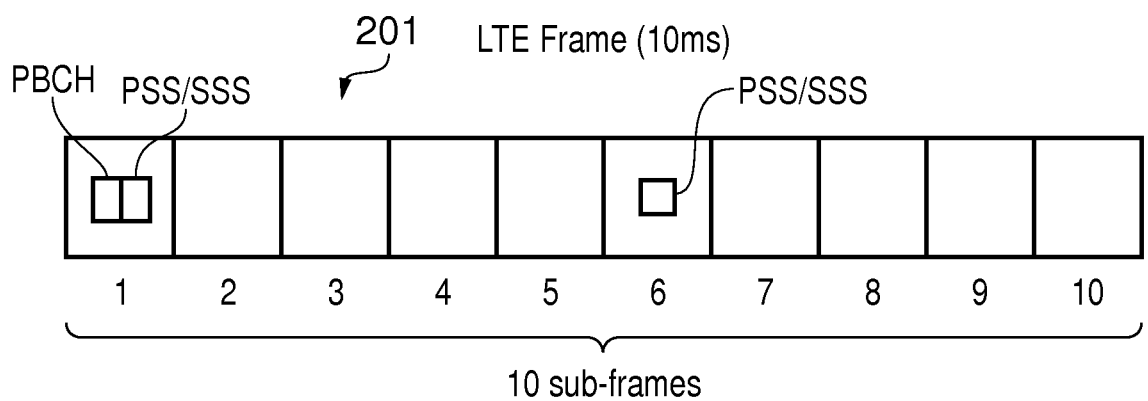
FIG. 2 provides a schematic diagram illustrating a LTE radio frame.

Mobile telecommunications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink. FIG. 2 shows a schematic diagram illustrating an OFDM based LTE downlink radio frame 201. The LTE downlink radio frame is transmitted from a LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A physical broadcast channel (PBCH) is transmitted in the first subframe of the LTE frame.

Figure 3:
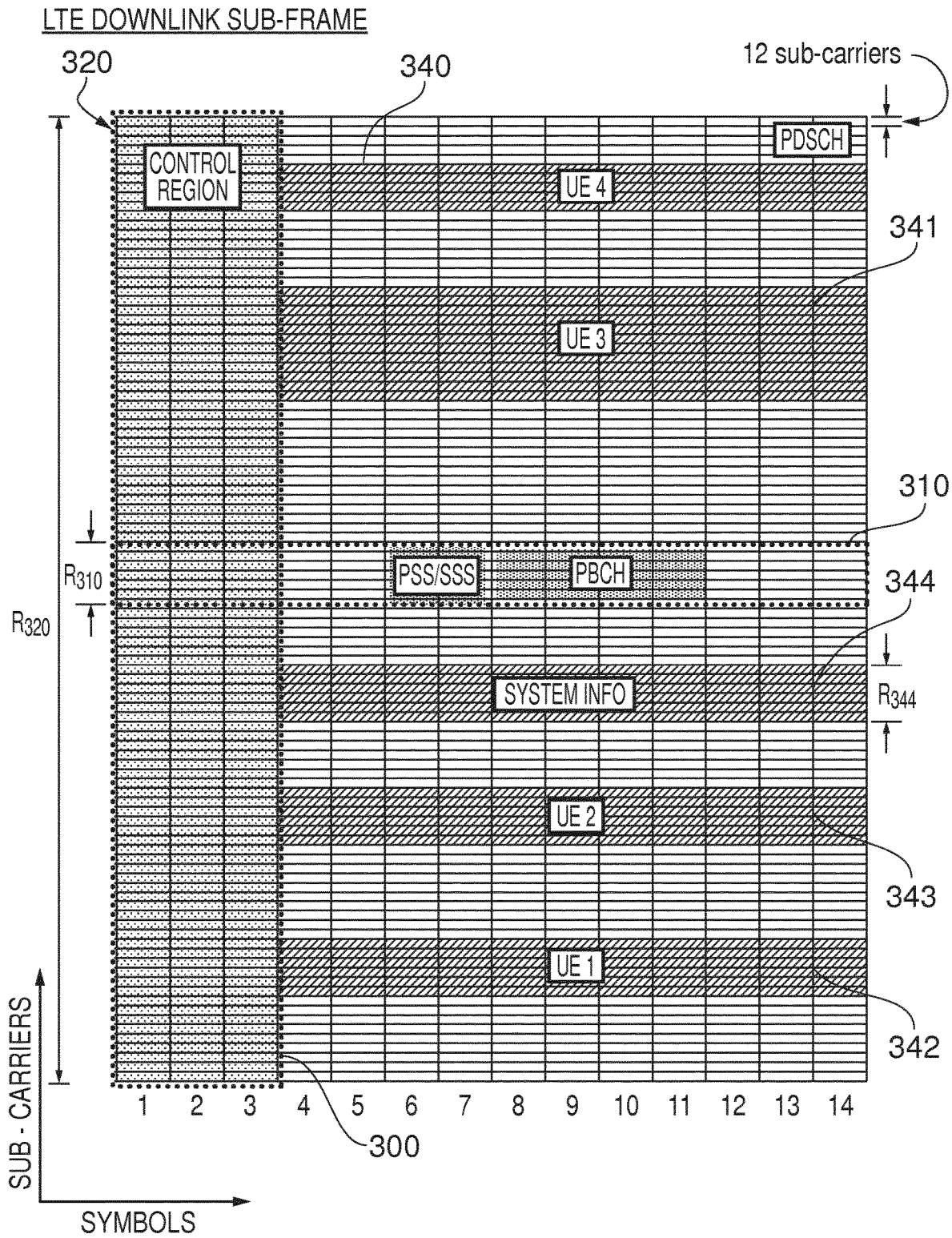
FIG. 3 provides a schematic diagram illustrating an example of a LTE downlink radio subframe.

FIG. 3 is a schematic diagram of a grid which illustrates the structure of an example conventional downlink LTE subframe. The subframe comprises a predetermined number of symbols which are transmitted over a 1 ms period. Each symbol comprises a predetermined number of orthogonal subcarriers distributed across the bandwidth of the downlink radio carrier.

The example subframe shown in FIG. 3 comprises 14 symbols and 1200 subcarriers spread across a 20 MHz bandwidth and in this example is the first subframe in a frame (hence it contains PBCH). The smallest allocation of physical resource for transmission in LTE is a resource block comprising twelve subcarriers transmitted over one subframe. For clarity, in FIG. 3, each individual resource element is not shown, instead each individual box in the subframe grid corresponds to twelve subcarriers transmitted on one symbol.

FIG. 3 shows in hatching resource allocations for four LTE terminals 340, 341, 342, 343. For example, the resource allocation 342 for a first LTE terminal (UE 1) extends over five blocks of twelve subcarriers (i.e. 60 subcarriers), the resource allocation 343 for a second LTE terminal (UE2) extends over six blocks of twelve subcarriers (i.e. 72 subcarriers), and so on.

Control channel data can be transmitted in a control region 300 (indicated by dotted-shading in FIG. 3) of the subframe comprising the first "n" symbols of the subframe where "n" can vary between one and three symbols for channel bandwidths of 3 MHz or greater and where "n" can vary between two and four symbols for a channel bandwidth of 1.4 MHz. For the sake of providing a concrete example, the following description relates to host carriers with a channel bandwidth of 3 MHz or greater so the maximum value of "n" will be 3 (as in the example of FIG. 3). The data transmitted in the control region 300 includes data transmitted on the physical downlink control channel (PDCCH), the physical control format indicator channel (PCFICH) and the physical HARQ indicator channel (PHICH). These channels transmit physical layer control information. Control channel data can also or alternatively be transmitted in a second region of the subframe comprising a number of subcarriers for a time substantially equivalent to the duration of the subframe, or substantially equivalent to the duration of the subframe remaining after the "n" symbols. The data transmitted in this second region is transmitted on the enhanced physical downlink control channel (EPDCCH). This channel transmits physical layer control information which may be in addition to that transmitted on other physical layer control channels.

PDCCH and EPDCCH contain control data indicating which subcarriers of the subframe have been allocated to specific terminals (or all terminals or subset of terminals). This may be referred to as physical-layer control signalling/data. Thus, the PDCCH and/or EPDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols for channel bandwidths of 3 MHz or greater and between two and four symbols for channel bandwidths of 1.4 MHz).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 subcarriers wide (corresponding to a transmission bandwidth of 1.08 MHz). The PSS and SSS are synchronisation signals that once detected allow a LTE terminal device to achieve frame synchronisation and determine the physical layer cell identity of the enhanced Node B transmitting the downlink signal. The PBCH carries information about the cell, comprising a master information block (MIB) that includes parameters that LTE terminals use to properly access the cell. Data transmitted to terminals on the physical downlink shared channel (PDSCH), which may also be referred to as a downlink data channel, can be transmitted in other resource elements of the subframe. In general PDSCH conveys a combination of user-plane data and non-physical layer control-plane data (such as Radio Resource Control (RRC) and Non Access Stratum (NAS) signalling). The user-plane data and non-physical layer control-plane data conveyed on PDSCH may be referred to as higher layer data (i.e. data associated with a layer higher than the physical layer).

FIG. 3 also shows a region of PDSCH containing system information and extending over a bandwidth of R344. A conventional LTE subframe will also include reference signals which are discussed further below but not shown in FIG. 3 in the interests of clarity.

The number of subcarriers in a LTE channel can vary depending on the configuration of the transmission network. Typically this variation is from 72 sub carriers contained within a 1.4 MHz channel bandwidth to 1200 subcarriers contained within a 20 MHz channel bandwidth (as schematically shown in FIG. 3). As is known in the art, data transmitted on the PDCCH, PCFICH and PHICH is typically distributed on the subcarriers across the entire bandwidth of the subframe to provide for frequency diversity. Therefore a conventional LTE terminal must be able to receive the entire channel bandwidth in order to receive and decode the control region.

As explained above, in a LTE subframe the PDSCH generally occupies groups of resource elements which follow the control region. The data in the blocks of resource elements 340, 341, 342, 343 allocated to the different mobile communication terminals (UEs) and the system information data in the block of resources 344 shown in FIG. 3 have a smaller bandwidth than the bandwidth of the entire carrier. To decode these blocks a terminal first receives the PDCCH spread across the frequency range R320 and/or the EPDCCH to determine if the (E)PDCCH indicates there are PDSCH resources in the subframe that need to be decoded by the UE. The intended recipient(s) for (E)PDCCH signalling in LTE is established through the use of radio network temporary identifiers (RNTI). (E)PDCCH signalling is addressed to a particular RNTI by using the RNTI to scramble cyclic redundancy check (CRC) bits associated with the (E)PDCCH signalling. Each connected UE in a cell is associated with a Cell RNTI (C-RNTI) that may be used to address PDCCH signalling to that particular UE. In addition there are other RNTIs defined and these may be used to simultaneously address groups of terminal devices. For example, a System Information RNTI (SI-RNTI) is defined and PDSCH transmissions comprising SI are allocated by (E)PDCCH signalling addressed to SI-RNTI. Various other RNTIs are defined for various other types of signalling. Some examples include a random-access RNTI (RA-RNTI), a Paging RNTI (P-RNTI), a Transmit Power Control Physical Uplink Control Channel RNTI (TPC-PUCCH-RNTI) and a Transmit Power Control Physical Uplink Shared Channel-RNTI (TPC-PUSCH-RNTI).

Thus, once a UE has received a downlink subframe, the UE searches for (E)PDCCH signalling associated with any RNTI that apply for the UE in the subframe to identify any corresponding allocations of transmission resources on PDSCH. If there is an allocation message addressed to the UE on (E)PDCCH the UE will proceed to decode the PDSCH in the relevant frequency range (if any) indicated by the PDCCH. So for example, UE 1 discussed above decodes the whole control region 300 to determine its resource allocation and then extracts the relevant data from the corresponding resource block 342.

Figure 4:
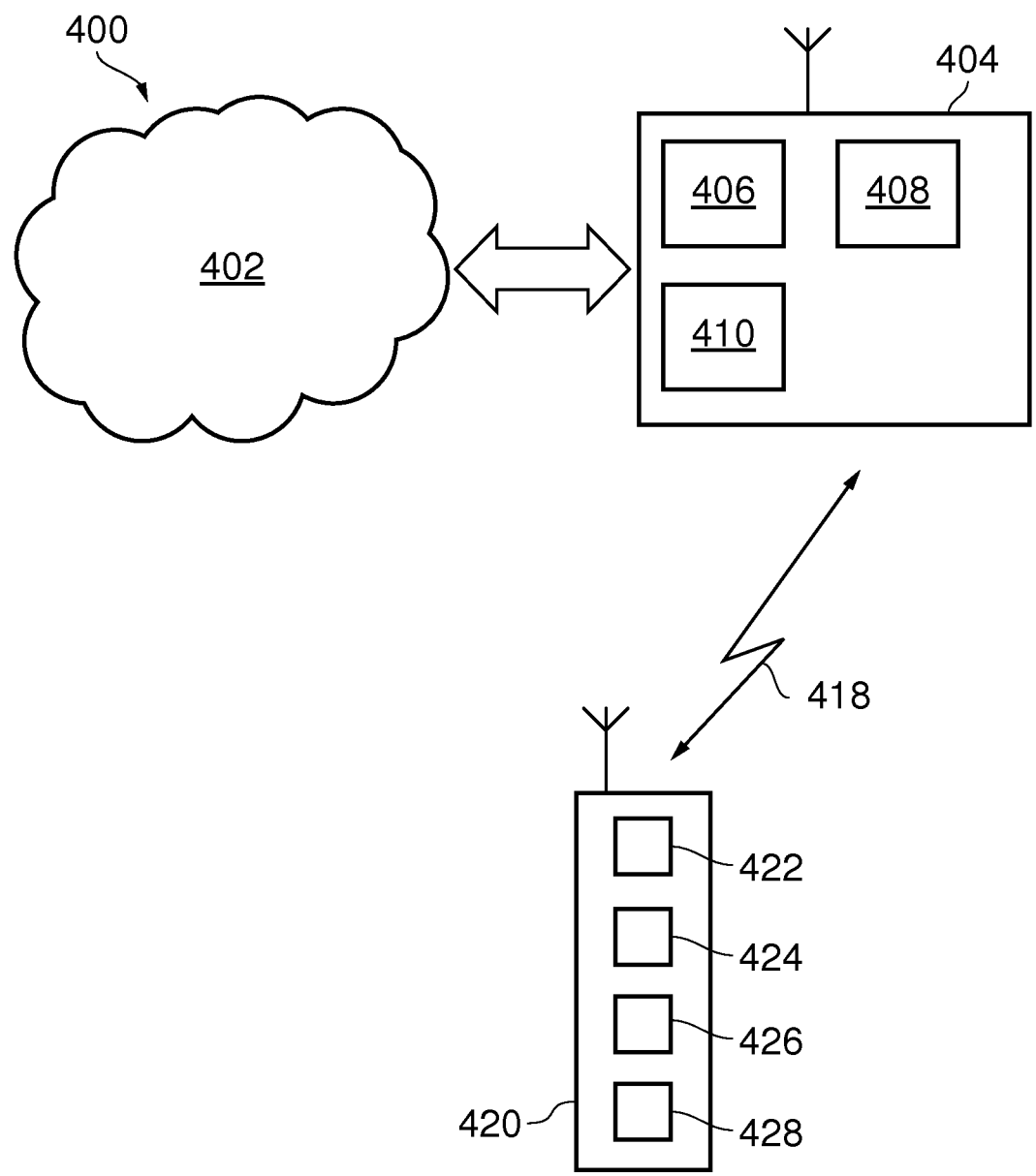
FIG. 4 schematically represents a wireless telecommunications system according to an embodiment of the disclosure.

FIG. 4 schematically shows a telecommunications system 400 according to an embodiment of the disclosure. The telecommunications system 400 in this example is based broadly on a LTE-type architecture. As such many aspects of the operation of the telecommunications system 400 are standard and well understood and not described here in detail in the interest of brevity. Operational aspects of the telecommunications system 400 which are not specifically described herein may be implemented in accordance with any known techniques, for example according to the established LTE-standards and known variations thereof.

The telecommunications system 400 comprises a core network part (evolved packet core) 402 coupled to a radio network part. The radio network part comprises a base station (evolved-nodeB) 404 and a terminal device 420. It will of course be appreciated that in practice the radio network part may comprise a plurality of base stations serving a larger number of terminal devices across various communication cells. However, only a single base station and terminal device are shown in FIG. 4 in the interests of simplicity.

As with a conventional mobile radio network, the terminal device 420 is arranged to wirelessly communicate data to and from the base station (transceiver station) 404. The base station is in turn communicatively connected to a serving gateway, S-GW, (not shown) in the core network part which is arranged to perform routing and management of mobile communications services to and from the terminal device 420 in the telecommunications system 400 via the base station 404. In order to maintain mobility management and connectivity, the core network part 402 also includes a mobility management entity (not shown) which manages the enhanced packet service, EPS, connections with terminal devices, such as terminal device 420, operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 402 to an external packet data network, for example the Internet. As noted above, the operation of the various elements of the communications system 400 shown in FIG. 4 may be broadly conventional apart from where modified to provide functionality in accordance with embodiments of the disclosure as discussed herein.

The terminal device 420 comprises a transceiver unit 422 for transmission and reception of wireless signals and a controller unit 424 configured to control the operation of the terminal device 420 in accordance with embodiments of the disclosure. The controller unit 424 comprises a processor unit which is suitably configured/programmed to provide the desired functionality described herein using conventional programming/configuration techniques for equipment in wireless telecommunications systems. The transceiver unit 422 and controller unit 424 are schematically shown in FIG. 4 as separate elements within terminal device 420 for ease of representation. However, it will be appreciated the functionality of these units can be provided in various different ways, for example using a single suitably programmed general purpose computer, or suitably configured application-specific integrated circuit(s)/circuitry, or using a plurality of discrete circuitry/processing elements for providing different elements of the desired functionality. It will be appreciated the terminal device 420 will in general comprise various other elements associated with its operating functionality in accordance with established wireless telecommunications techniques (e.g. a power source, possibly a user interface, and so forth).

As has become commonplace in the field of wireless telecommunications, terminal devices may support Wi-Fi and Bluetooth functionality in addition to cellular/mobile telecommunications functionality. Thus the transceiver unit 422 of the respective terminal device may comprise functional modules operable according to different wireless communications operating standards. For example, the terminal devices' transceiver units may each comprise an LTE transceiver module for supporting wireless communications in accordance with an LTE-based operating standard, a WLAN transceiver module for supporting wireless communications in accordance with a WLAN operating standard (e.g. a Wi-Fi standard), and a Bluetooth transceiver module for supporting wireless communications in accordance with a Bluetooth operating standard. The underlying functionality of the different transceiver modules may be provided in accordance with conventional techniques. For example, a terminal device may have separate hardware elements to provide the functionality of each transceiver module, or alternatively, a terminal device might comprise at least some hardware elements which are configurable to provide some or all functionality of multiple transceiver modules. Thus the transceiver unit 422 of the terminal device 420 represented in FIG. 4 is assumed here to provide the functionality of an LTE transceiver module, a Wi-Fi transceiver module and a Bluetooth transceiver module in accordance with conventional wireless communications techniques.

In addition to these elements, the terminal device 420 operating in accordance with embodiments of the disclosure comprises a GPS module 426 and a pressure sensor 428. The GPS module 426 is operable in conjunction with the controller unit 424 to establish a position of the terminal device from signals received from GPS satellites in accordance with conventional techniques. The pressure sensor 428 (which may also be referred herein to as a barometer) is configured in conjunction with the controller unit 424 to establish a measurement of atmospheric/barometric pressure at the terminal device 420. The pressure sensor 428 may be based on any established techniques for sensing atmospheric pressure and may be controlled by the controller unit 424 to undertake measurements of barometric pressure and to provide an indication of measured pressures to the controller unit 424 in accordance with generally conventional sensor techniques.

In this example the barometer 428 is based on a solid-state barometer, such as the BMP180 digital barometric pressure sensor from Bosch Sensortec—http://www.bosch-sensortec.com/en_GB/homepage/products_3/environmental_sensors_1/bmp180_1/bmp180 [3], the BMP280 barometric pressure sensor from Bosch Sensortec—http://www.bosch-sensortec.com/en_GB/homepage/products_3/environmental_sensors_1/bmp280/bmp280 [4], or the BME280 integrated environmental sensor from Bosch Sensortec—http://www.bosch-sensortec.com/en_GB/homepage/products_3/environmental_sensors_1/bme280/bme280_1 [5]. However, other types of "off the shelf" barometer could equally be used in accordance with other examples of the disclosure.

The base station 404 comprises a transceiver unit 406 for transmission and reception of wireless signals and a controller unit 408 configured to control the base station 404. The controller unit 408 may comprise a processor unit which is suitably configured/programmed to provide the desired functionality described herein using conventional programming/configuration techniques for equipment in wireless telecommunications systems. The transceiver unit 406 and the controller unit 408 are schematically shown in FIG. 4 as separate elements for ease of representation. However, it will be appreciated that the functionality of these units can be provided in various different ways, for example using a single suitably programmed general purpose computer, or suitably configured application-specific integrated circuit(s)/circuitry or using a plurality of discrete circuitry/processing elements for providing different elements of the desired functionality. It will be appreciated the base station 404 will in general comprise various other elements associated with its operating functionality. For example, the base station 404 will in general comprise a scheduling entity responsible for scheduling communications. The functionality of the scheduling entity may, for example, be subsumed by the controller unit 408.

In addition to these elements, the base station 404 comprises a calibration information generator unit 410 for generating calibration information to be used for calibrating pressure measurements from the pressure sensor 428 of the terminal device 420 as described further herein. The calibration information generator unit 410 may generate different kinds of information in accordance with different embodiments of the disclosure as described further below. In this example the calibration information generator unit 410 is a pressure sensor (barometer) configured in conjunction with the controller unit 408 of the base station 404 to establish measurements of atmospheric/barometric pressure at the base station 404. As for the pressure sensor 428 of the terminal device 420, the pressure sensor 410 of the base station 404 may be based on any established techniques for sensing atmospheric pressure and may again be controlled by the controller unit 408 to undertake measurements of barometric pressure and to provide an indication of measured pressures to the controller unit 404 in accordance with generally conventional sensor techniques. Thus the calibration information generator unit 410 of the base station may again comprise a solid-state barometer, such as the BMP180 [3], BMP280 [4], or the BME280 [5] referred to above. However, any other "off the shelf" barometer technology could equally be used.

Thus, the base station 404 and the terminal device 420 are both operable to measure the air pressure in their vicinity (local air pressure) using their respective pressure sensors 410, 428. The base station 404 and terminal device 420 are also operable to communicate data with one another over a wireless (radio) communication link 418 in accordance with the established practices of wireless (cellular) telecommunications systems.

As noted above, there is a need for improved schemes for determining the height (vertical location/altitude) of a terminal device operating in a wireless telecommunications system. The Inventor has recognized that providing a terminal device with a pressure sensor (barometer) can help with determining the terminal device's height (i.e. its vertical offset from a reference location, such as sea level). It is known that barometers (atmospheric pressure sensors) can be used to provide height information and pressure sensors for measuring atmospheric pressure are available which are suitable for incorporation in terminal devices, such as smartphones [3], [4], [5]. However the relationship between atmospheric pressure (e.g. as measured by a barometer) and height depends on climactic conditions, and this means a simple measurement of atmospheric pressure in the vicinity of a terminal device may not be able to identify the height of the terminal device with a desired level of accuracy.

Air pressure typically falls exponentially with increasing height and there are various models for how pressure varies with height. One recognized model (barometric formula) for the variation in pressure (P) with height (h) for an isothermal atmosphere is provided by the equation:

$$P(h) = P_0 e^{-Mgh/RT} \qquad \text{Equation 1:}$$

where $P_0$ is the pressure at a reference height, commonly taken to be sea level, P(h) is the pressure at a height h above the reference height, M is the molar mass of Earth's air (which may be taken to be around 0.0290 kg mol$^{-1}$), g is the acceleration due to gravity (9.81 m s$^{-2}$), R is the molar gas constant (8.31 m$^2$ kg s$^{-2}$ K$^{-1}$ mol$^{-1}$) and T is the temperature of the atmosphere (typically on the order of 290 K).

Another recognized model for the variation in pressure (P) with height (h) applicable for a non-isothermal atmosphere (i.e. an atmosphere in which temperature falls with height) is provided by the equation:

$$P(h) = P_0 \left[ \frac{T_0}{T_0 + L(h)} \right]^{-Mg/RL} \qquad \text{Equation 2}$$

where again $P_0$ is the pressure at a reference height, commonly taken to be sea level, P(h) is the pressure at a height h above the reference height, M is the molar mass of Earth's air (around 0.0290 kg mol$^{-1}$), g is the acceleration due to gravity (9.81 m s$^{-2}$), R is the molar gas constant (8.31 m$^2$ kg s$^{-2}$ K$^{-1}$ mol$^{-1}$), $T_0$ is the temperature of the atmosphere at the reference height (typically on the order of 290 K) and L is the temperature lapse rate (typically around 6.5×10$^{-3}$ K m$^{-1}$).

Various other barometric formulae are known, for example although Equation 2 uses the temperature of the atmosphere at the reference height, it can be readily reformulated to use the temperature T at the height h by in effect by replacing $T_0$ with T+Lh.

An issue with using such barometric formulae to establish the height of a terminal device from a measure of barometric pressure made at the terminal device is the pressure at a given height above a reference level/altitude (e.g. sea level) scales linearly with the pressure at the reference point, can vary with changing climatic conditions. For example, assuming a sea-level pressure of 1000 mbar (equivalent to 1000 hPa) and assuming a uniform temperature of around 290 K in the lower atmosphere, a pressure measurement of around 1010 mbar corresponds with a height of around 100 m above sea level. However, if the pressure at sea level were to change by 1 mbar, for example due to changing weather conditions, a pressure measurement of 1010 mbar would correspond to a height of around 90 meters. Thus, a change in pressure at sea level of 1 mbar has the same effect on a measured pressure as a 10 m change in the Height at which the pressure is measured. It is not uncommon for air pressure to change by 10 mbar during a day, and without taking account of this change, corresponding estimates of altitude based on pressure measurements at a fixed height may vary by 100 m or so.

Therefore to more reliably estimate an altitude of a terminal device from a measurement of the air pressure in the vicinity of the terminal device, the measurement should be calibrated using calibration information, which might comprise an indication of a reference pressure at a reference altitude, for example an indication of pressure at sea level. The terminal device may then determine its height relative to the reference altitude (e.g. sea level) based on the difference between the air pressure measured at the terminal device and the reference air pressure (e.g. the pressure at sea level) using any of the established barometric formulae. In general the most appropriate barometric formula (relationship between pressure and height) may be selected according to the situation at hand. For example, it may be expected that terminal devices will generally be operating at heights of less than 1 km, and so and so a barometric formula that is considered to be most accurate in this regime of the atmosphere may be used (for example as compared to one considered appropriate for altitudes relevant for aircraft). Thus the specific barometric formula adopted may be based on any known models for pressure variation with height.

In view of the above, the Inventor has recognized the importance of using calibration information when seeking to determine the altitude of a terminal device from a pressure measurement made by the terminal device. Furthermore, the Inventor has recognized how a base station can be used to establish appropriate calibration information, for example an indication of a reference barometric pressure for a reference altitude.

Figure 5:
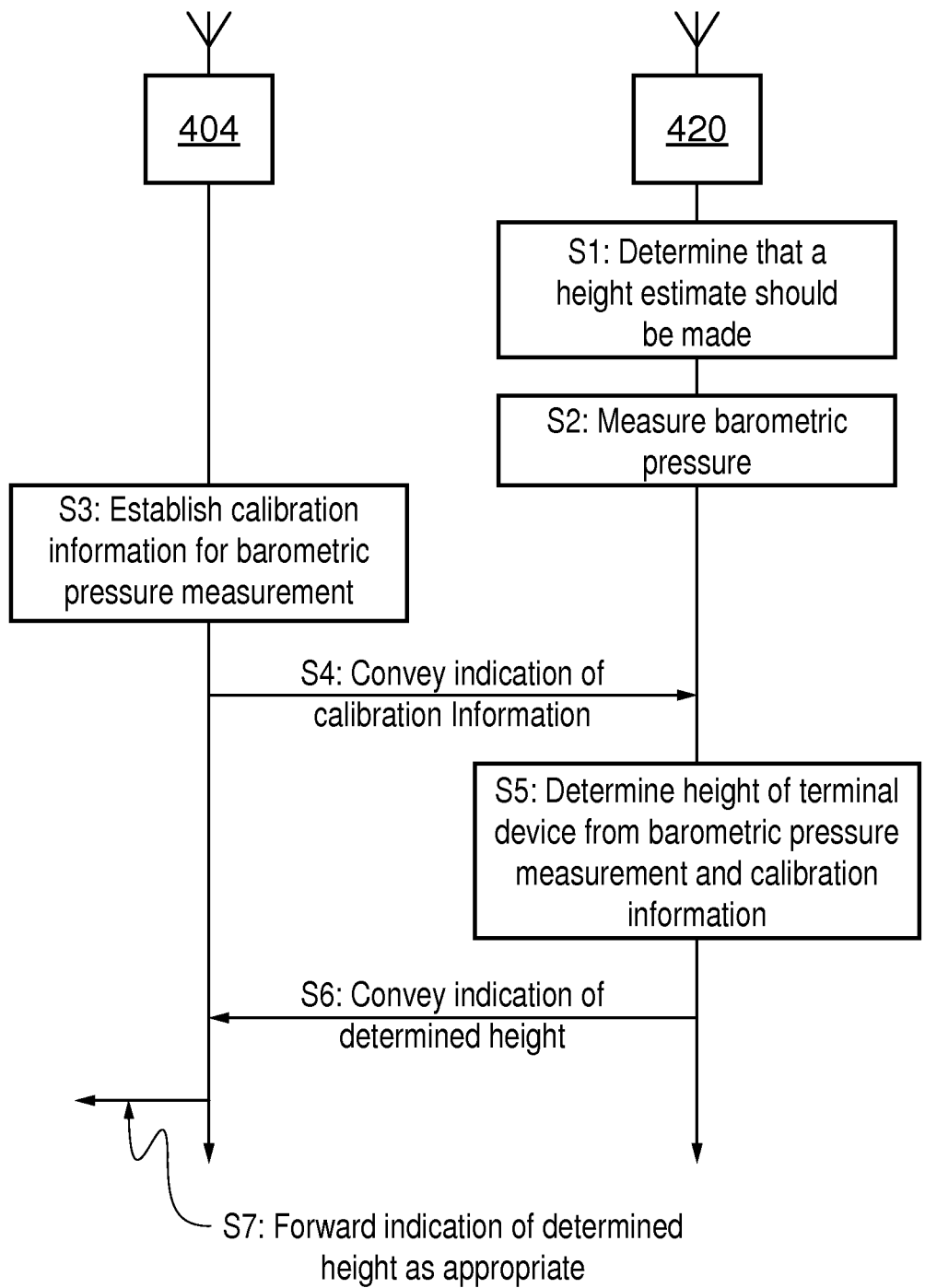
FIG. 5 is a ladder diagram schematically representing methods of operation in accordance with certain embodiments of the disclosure.

FIG. 5 is a ladder diagram schematically representing modes of operation of the base station 404 and the terminal device 420 represented in FIG. 4 in accordance with some embodiments of the disclosure.

The processing begins in step S1 in which the terminal device determines that a height estimate should be made. The reason why the terminal device has determined a height estimate should be made is not significant. For example, in some implementations the terminal device may be configured to determine its height according to a regular schedule. In other implementations, the terminal device may be configured to determine its height in response to a user input. For example, the user may place an emergency call and the terminal device may be configured to automatically determine its height in response to this (i.e. so it can be reported to an emergency responder). In other implementations, the terminal device may be configured to determine its height in response to signaling received from a base station instructing the terminal device to do so.

In general, it may be expected that in step S1 the terminal device will in fact determine that a full 3D position estimate should be made (i.e. including horizontal position information, such as latitude and longitude, as well as height information/altitude information). However, it is assumed here the horizontal positioning information is established using conventional means, for example using GPS techniques, possibly with assistance from other positioning technologies, such as those using wireless LAN (Wi-Fi) and/or Bluetooth (e.g. iBeacon) signaling. However, since it is assumed here the terminal device may determine its horizontal position in accordance with conventional techniques, the focus in FIG. 5 is how the terminal device may establish an indication of its altitude in accordance with embodiments of the disclosure.

In step S2 the terminal device 420 uses its pressure sensor 428 to establish a measurement of barometric pressure in the vicinity of the terminal device. This step may be performed in accordance with conventional pressure measurement techniques. The measurement of barometric pressure (or at least an indication of the measurement of barometric pressure) is reported by the pressure sensor 428 to the controller unit 424 of the terminal device 420.

In step S3 of the processing represented in FIG. 5, the base station establishes calibration information to be used for establishing a height of the terminal device from the barometric pressure measurement made in step S2. In this example implementation it is assumed the calibration information is based on a measurement of barometric pressure made by the base station 404. In particular, it is assumed here the calibration information comprises an estimate of what the sea-level pressure $P_0$ would be at the horizontal position of the base station having regard to pressure measured at the altitude of the base station. In effect, the calibration information is a normalized version of the pressure measured by the base station itself. The base station is at a known fixed altitude and so pressure measurements at the base station can be readily converted to corresponding pressure measurements at sea level in accordance with conventional techniques (e.g. using a barometric formula such as those described above).

In step S4 the base station conveys an indication of the calibration information to the terminal device.

There are various ways in which step S3 and step S4 may be performed. In this example it is assumed the base station is configured to perform step S3 according to a predefined regular schedule and to convey the indication of the calibration information to the terminal device (and other terminal devices) in broadcast information (i.e. information that is receivable by a plurality of terminal devices), for example in association with transmissions of system information. Accordingly, and although not shown in FIG. 5, with this approach the terminal device receives an indication of calibration information from the base station on a regular cycle regardless of whether or not the terminal device has decided a height estimate should be made. However, in other examples the base station may be configured to provide calibration information to the terminal device in a dedicated manner in response to a request received from the terminal device. For example, the terminal device 420 may be configured to send a request message to the base station 404 to ask the base station to performed steps S3 and S4. In general, the transfer of the calibration information may be performed in accordance with any known signaling techniques for exchanging data in wireless telecommunications systems.

In step S5 the terminal device uses the measurement of barometric pressure obtained in step S2 and the calibration information received from the base station in step S4 to establish an estimate of altitude/height relative to the reference altitude associated with the reference barometric pressure comprising the calibration information. This step may be performed using any of the well-established techniques for determining the height of a barometer from its pressure measurements and a reference pressure measurement at a reference altitude, which in this case is the indication of the pressure at sea level for the location of the base station. For example, either of the Equations 1 and 2 could form the basis for the determination of height made in step S5. In this regard, a value for temperature T may be assumed (e.g. corresponding to an average temperature), or as described further below, a value of temperature T for use in a barometric formula used in step S5 may be based on a measured value for temperature, for example a measure of temperature made by the terminal device.

In this example implementation it is assumed the altitude of the terminal device is being determined because it is needed by another element of the wireless telecommunications system, for example a terminal device associated with an emergency responder seeking to locate the terminal device 420. Thus, in step S6 the terminal device 420 conveys an indication of the determine height information to the base station 404. The transfer of the indication of the determined height from the terminal device 420 to the base station 404 may again be performed in accordance with any known signaling techniques for exchanging data in wireless telecommunications systems.

In step S7 the base station forwards the indication of the determined height as appropriate, for example routing it on towards the terminal device of an emergency responder seeking to locate the terminal device 420.

Thus, the processing described above with reference to FIG. 5 shows one approach for determining the height (altitude) of a terminal device in a wireless telecommunications system based on a measurement of barometric pressure at the terminal device and a measurement of barometric pressure at the base station. In accordance with this approach it is in effect assumed the pressure at sea level at the horizontal location of the terminal device corresponds with the pressure at sea level at the horizontal location of the base station.

It will be appreciated the approach described above may be modified in various ways. For example, whereas in step S3 described above the calibration information established by the base station comprises an indication of a reference barometric pressure normalized to sea level, the calibration information could instead comprise an indication of the pressure measured at the base station and an indication of the height of the base station. In effect, with this approach the height of the base station (instead of sea level) is used as the reference altitude for the reference barometric pressure. Accordingly, the terminal device in effect determines its altitude relative to the height of the base station, rather than to sea level. The altitude of the base station may then be added to the height determined by the terminal device to provide an altitude for the terminal device relative to sea level if desired. This last step can be performed by the base station, or could be performed by the terminal device if the terminal devices is aware of the height of the base station (for example from a database stored at the terminal device or from information broadcast by the base station). Furthermore, the calibration information for the location of the base station may be determined from meteorological data supplied to the base station rather than from a measurement of pressure at the base station itself.

Figure 6:
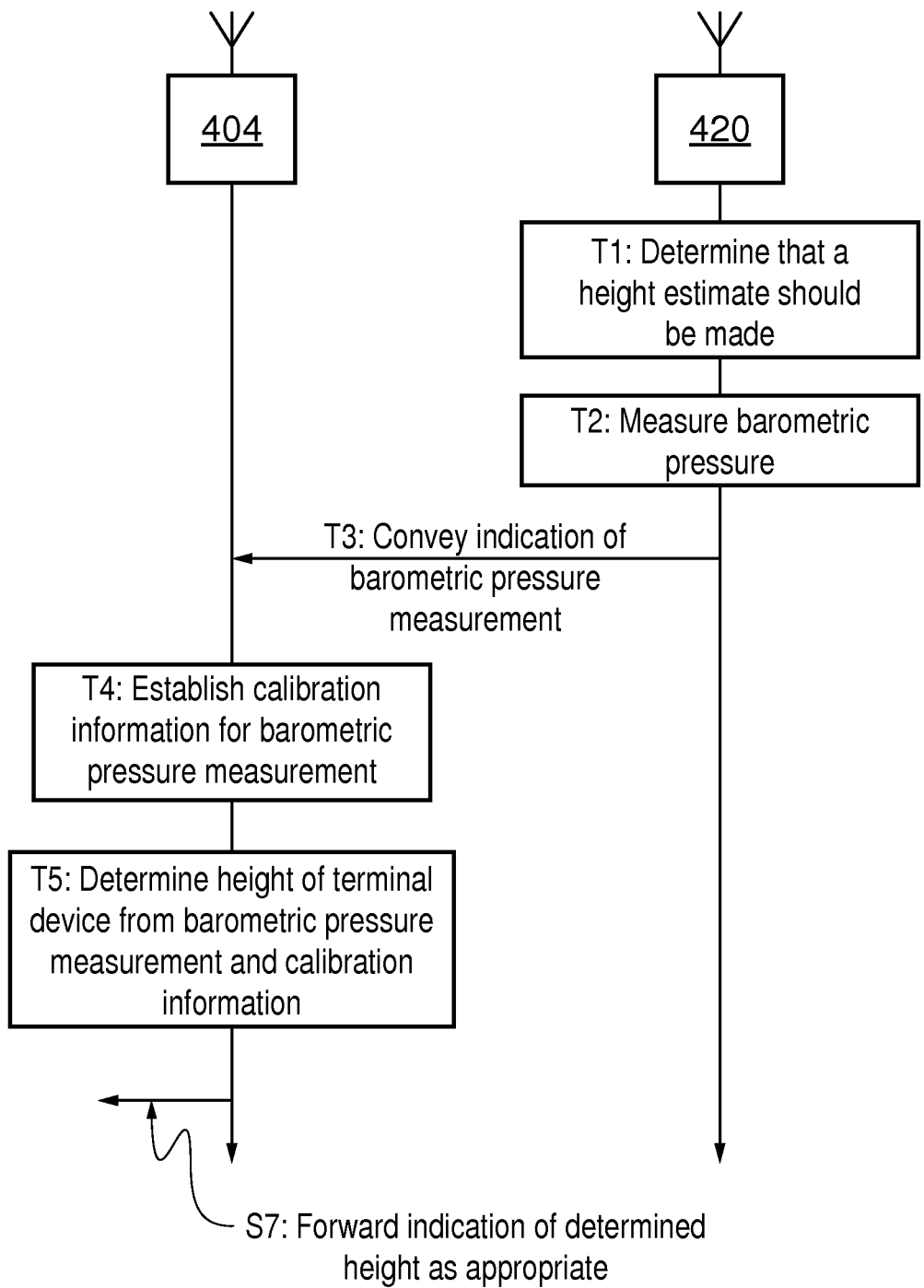
FIG. 6 is a ladder diagram schematically representing methods of operation in accordance with certain other embodiments of the disclosure.

FIG. 6 is a ladder diagram schematically representing modes of operation of the base station 404 and the terminal device 420 represented in FIG. 4 in accordance with some other embodiments of the disclosure. The approach of FIG. 6 is generally similar to, and will be generally understood from, the approach of FIG. 5. However, whereas in the approach of FIG. 5 it is the terminal device 420 that determines its height using its measurement of barometric pressure and calibration information received from the base station, in the approach of FIG. 6 it is the base station that determines the height of the terminal devices using the calibration information it has established and an indication of the terminal device's measurement of barometric pressure received from the terminal device.

Thus steps T1 and T2 of FIG. 6 may be performed in the same manner as steps S1 and S2 of FIG. 5. However, in step T3 FIG. 6, the terminal device conveys an indication of the barometric pressure measurement obtained from step T2 to the base station. This is in contrast to the base station conveying an indication of the calibration information to the terminal device in Step S4 of FIG. 5. Again, the transfer of the indication of the barometric pressure measurement from the terminal device 420 to the base station 404 may be performed in accordance with any known signaling techniques for exchanging data in wireless telecommunications systems.

Step T4 of the processing represented in FIG. 6 is similar to, and will be understood from, step S3 of FIG. 5. However, in this example it is assumed the base station is configured to perform step T4 in response to receiving the indication of the barometric pressure measurement from the terminal device in step T3. The calibration information established in step T4 may otherwise correspond with that established in step S3 described above.

Step T5 of the processing represented in FIG. 6 is similar to and will be understood from the processing represented in step S5 in FIG. 5. However, in accordance with the approach of FIG. 6, the determination of the height based on the barometric pressure measurement from the terminal device and the calibration information established by the base station is performed by the base station, rather than by the terminal device. The processing may otherwise be the same in both cases.

In this example implementation it is again assumed the altitude of the terminal device is being determined because it is needed by another element of the wireless telecommunications system, for example a terminal device associated with an emergency responder seeking to locate the terminal device 420. Thus, in step T6 the base station forwards the indication of the determined height as appropriate, for example routing it on towards the terminal device of an emergency responder seeking to locate the terminal device 420. In some cases the base station may also convey an indication of the determined height back to the terminal device, but this may not be required.

Thus, the approach of FIG. 6 is based on the same principles as the approach of FIG. 5, except it is the base station rather than the terminal device which has access to both the calibration information and the measured barometric pressure to determine the height of the terminal device.

As already noted, in the approaches of FIGS. 5 and 6, the calibration information corresponds with a reference barometric pressure for the horizontal location of the base station and the height determination in effect assumes the reference barometric pressure is also applicable for the horizontal location of the terminal device. To reduce the impact of this effect, in some implementations the terminal device may be configured to receive calibration information from a plurality of surrounding base stations and to interpolate calibration information relevant for its own horizontal location based on the reference barometric pressure measurements received from the surrounding base stations and their corresponding locations. The locations of the base stations may be conveyed to the terminal device in signaling or stored in a database at the terminal device, or the terminal device may simply determine a distance to the respective base stations based on the respective strength of the signaling received from the respective base stations or based on the time taken for signaling to travel between the terminal device and the respective base station (propagation delay). The terminal device may generate an average reference barometric pressure based on a weighted average of the reference barometric pressure is received from the different base stations, with the weighting been based on their distances (i.e. with more weight given to nearby base stations). In effect this provides for the interpolation of calibration information from multiple base stations. In this regard it would be beneficial for each base station's reference pressure to correspond with a common reference altitude (e.g. sea level) to reduce the complexity of computation required at the terminal device.

In another approach the calibration information (reference barometric pressure for a reference altitude (e.g. sea level)) may be information relating to the horizontal location of the terminal device itself.

For example, steps corresponding to steps S3 and T4 may be modified in accordance with other embodiments of the disclosure to have the base station establish calibration information that also takes account of the horizontal location of the terminal device. For example, the base station may obtain meteorological data comprising a weather report for the region containing the terminal device, and on determining the height estimate is being made by the terminal device may be configured to establish a reference barometric pressure (e.g. assumed sea level pressure) for the location of the terminal device from the meteorological data. The base station may determine the horizontal location of the terminal device from existing mobility data in the network, or in the alternative, the terminal device may be configured to report its horizontal location, for example determined using a GPS receiver, to the base station in association with a request for calibration information. Calibration information relevant for the location of the terminal device that is established in this way may otherwise be used to determine the height of the terminal device in the same manner as described. In principle, rather than have the base station determine an indication of the terminal device's horizontal location to establish an appropriate reference pressure for that location to convey as calibration information to the terminal device, the base station may instead convey calibration information to the terminal device comprising data representing a map of reference pressures for a region in which the terminal device is located, and the terminal device may then determine an appropriate reference pressure from the map of reference pressures based on its own knowledge of its own location (for example determined from GPS).

It will be appreciated there will generally be a degree of temperature dependence in how a given pressure measurement translates to a height measurement. For example, assuming typical values near the Earth surface, a change in temperature of around 1K would change the pressure at 100 m by around 0.035 mbar (equivalent to a height difference of around 35 cm). Nonetheless, if desired account may also be taken of temperature. This can be achieved by providing the terminal device with a temperature sensor and using measurements of the temperature T at the terminal device in an appropriate barometric formula (e.g. as opposed to using an assumed fixed value for temperature that might be considered appropriate for other implementations). In this regard, the terminal device may be configured to use its measurement of temperature T when determining its altitude in accordance with a step corresponding to step S5 of FIG. 5, for example using a barometric formula corresponding to that of Equation 2 above, but modified to replace $T_0$ with T+Lh. Likewise, if the corresponding barometric formula for an isothermal atmosphere is being used (Equation 1), the value of T in this equation may correspond with the measurement of temperature made by the terminal device (as opposed to a fixed assumed value which might be adopted for some other implementations). In embodiments of the disclosure in which the base station is responsible for determining the altitude of the terminal device, the terminal device may be configured to convey an indication of its temperature measurement to the base station in a step corresponding to T4 of FIG. 6, and the base station may then use the temperature information in a step corresponding to T5, in accordance with the relevant barometric formula that has been adopted.

It will further be appreciated that while the above-described embodiments have focused on implementations in which a base station establishes calibration information to be used in conjunction with a pressure measurement from a terminal device to help establish the altitude/height of the terminal device, in other examples other network entities may provide the calibration information. For example, in some examples it may be a second terminal device, instead of a base station, that establishes calibration information to be used to determine the height of a first terminal device from a barometric pressure measurement associated with the first terminal device. For example, in a situation where a second terminal device has already established its own height (for example because it is manually entered by an operator of the second terminal device based on some external reference or because the second terminal device has established its own height with assistance from a base station in accordance with the principles described above with reference to FIGS. 5 and 6), the second terminal device may then be the network entities which provides calibration information to the first terminal device, for example based on a pressure measurement made by the second terminal device. In this regard, the nature of the calibration information provided by the second terminal device and the manner in which it is used by the first terminal device may follow the same principles as described above for examples in which the calibration information is established by a base station. In some implementations, the second terminal device might not even establish its own height in any absolute sense. For example, the second terminal device may simply transmit its own pressure measurements to the first terminal device as calibration information. The first terminal device may then determine its height relative to the height of the second terminal device based on differences in its own pressure measurement as compared to the reference pressure measurement received from the second terminal device. This will allow the first terminal device to determine its height relative to the height of the second terminal device, and this may, for example, be reported back to the second terminal device. Thus, an operator of the second terminal device is provided with an indication of how far the first terminal device is above or below the operator. In this regard, the reference height associated with the reference pressure measurement may simply be the current height of the second terminal device. This approach may thus provide an emergency responder with an indication of whether or not they are currently on the same floor of a building as the first terminal device, or whether the first terminal device is above or below them, and if so, by how far. Conversely, the first terminal device may be configured to transmit its pressure measurements to the second terminal device, so the second terminal device compares the measurement with its own measurements of pressure to determine when they are the same, thereby identifying that the second terminal device is at the same height (e.g. on the same floor of a building) as the first terminal device.

Thus there has been described methods and apparatus for determining an altitude for a terminal device operating in a wireless telecommunications network comprising the terminal device and another network entity (e.g. a base station or another terminal device). The terminal device measures an indication of barometric pressure in its vicinity using a barometric sensor. The other network entity establishes calibration information for terminal device's barometric pressure measurement. The calibration information comprises a reference barometric pressure for a reference altitude and may come from a barometric pressure measurement at the other network entity or from meteorological data provided to the other network entity. The altitude of the terminal device relative to the reference altitude may then be determined from the difference between the barometric pressure measured by the terminal device and the reference barometric pressure. The altitude may be determine by the terminal device after receiving the calibration information from the other network entity and/or by the other network entity after receiving an indication of the barometric pressure measured by terminal device.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of determining an altitude of a terminal device operating in a wireless telecommunications network comprising the terminal device and another network entity, the method comprising: measuring, by the terminal device, an indication of barometric pressure in the vicinity of the terminal device; establishing, at the other network entity, calibration information for the indication of barometric pressure measured at the terminal device; and determining the altitude of the terminal device from the indication of barometric pressure measured by the terminal device and the calibration information established at the other network entity.

Paragraph 2. The method of paragraph 1, further comprising the other network entity conveying an indication of the calibration information to the terminal device, and wherein the terminal device performs the step of determining the altitude of the terminal device from the indication of barometric pressure measured by the terminal device and the calibration information established at the other network entity.

Paragraph 3. The method of paragraph 2, further comprising the terminal device conveying an indication of the determined altitude to the other network entity.

Paragraph 4. The method of paragraph 3, further comprising the other network entity forwarding an indication of the determined altitude to another element of the wireless telecommunications network.

Paragraph 5. The method of any of paragraphs 2 to 4, wherein the indication of the calibration information is conveyed to the terminal device in broadcast signalling transmitted by the other network entity.

Paragraph 6. The method of paragraph 5, wherein the indication of the calibration information is conveyed to the terminal device in association with network information transmitted by the other network entity.

Paragraph 7. The method of any of paragraphs 2 to 6, further comprising the terminal device receiving an indication of further calibration information established by at least one further other network entity, and wherein the altitude of the terminal device is determined by the terminal device using the further calibration information received from the at least one further other network entity.

Paragraph 8. The method of paragraph 7, wherein the step of determining the altitude of the terminal device takes account of the relative distances between the terminal device and the other network entity and between the terminal device and the at least one further other network entity.

Paragraph 9. The method of claim 8, further comprising determining the relative distances between the terminal device and the other network entity and further other network entity from signal strengths and/or signal propagation delays associated with signalling between the terminal device and the respective network entities.

Paragraph 10. The method of any of paragraphs 1 to 9, further comprising the terminal device conveying an indication of barometric pressure measured by the terminal device to the other network entity, and wherein the other network entity performs the step of determining the altitude of the terminal device from the indication of barometric pressure measured by the terminal device and the calibration information established at the other network entity.

Paragraph 11. The method of paragraph 10, further comprising the other network entity conveying an indication of the determined altitude to the terminal device.

Paragraph 12. The method of paragraph 10 or 11, further comprising the other network entity forwarding an indication of the determined altitude to another element of the wireless telecommunications network.

Paragraph 13. The method of any of paragraphs 1 to 12, wherein the calibration information comprises an indication of a reference barometric pressure for a reference altitude.

Paragraph 14. The method of paragraph 13, wherein the altitude of the terminal device is determined relative to the reference altitude from a difference between the indication of the barometric pressure measured by the terminal device and the indication of the reference barometric pressure.

Paragraph 15. The method of paragraph 13 or 14, wherein the altitude of the terminal device relative to the reference altitude is determined by comparing the difference between the indication of the barometric pressure measured by the terminal device and the indication of the reference barometric pressure with a model of variations in barometric pressure with altitude.

Paragraph 16. The method of any of paragraphs 13 to 15, wherein the indication of the reference barometric pressure comprises an indication of barometric pressure in the vicinity of the other network entity.

Paragraph 17. The method of paragraph 16, wherein the indication of barometric pressure in the vicinity of the other network entity is an indication of barometric pressure measured by the other network entity.

Paragraph 18. The method of paragraph 16 or 17, wherein reference altitude is an altitude of the other network entity.

Paragraph 19. The method of any of paragraphs 13 to 18, further comprising the other network entity obtaining meteorological data for a region containing the terminal device and an indication of a horizontal position for the terminal device within the region, and wherein the indication of the reference barometric pressure comprises an indication of barometric pressure in the vicinity of the terminal device for the reference altitude which is established by the other network entity from the meteorological data.

Paragraph 20. The method of any of paragraphs 1 to 19, further comprising the terminal device establishing an indication of its horizontal position and conveying the indication of its horizontal position to the other network entity.

Paragraph 21. The method of any of paragraphs 1 to 20, wherein the indication of the terminal device's horizontal position is determined using a GPS receiver unit and/or a wireless local area network transceiver unit and/or a Bluetooth transceiver unit.

Paragraph 22. The method of any of paragraphs 1 to 21, wherein the other network entity is a other network entity of the wireless telecommunication network.

Paragraph 23. The method of any of paragraphs 1 to 21, wherein the other network entity is anther terminal device operating in the wireless telecommunication network.

Paragraph 24. A wireless telecommunications network, comprising: a terminal device configured to measure an indication of barometric pressure at the terminal device; and another network entity configured to establish calibration information for the indication of barometric pressure measured at the terminal device, wherein at least one of the terminal device and the other network entity is configured to determine an indication of an altitude of the terminal device from the indication of barometric pressure measured at the terminal device and the calibration information established at the other network entity.

Paragraph 25. A method of operating a terminal device in a wireless telecommunications network to determine an altitude for the terminal device; the method comprising: measuring an indication of barometric pressure at the terminal device; receiving calibration information for the indication of barometric pressure measured at the terminal device from another network entity; and determining the altitude of the terminal device from the indication of barometric pressure measured at the terminal device and the calibration information received from the other network entity.

Paragraph 26. A terminal device comprising: a pressure sensor configured to measure an indication of barometric pressure; a transceiver unit configured to receive calibration information for the indication of barometric pressure measured by the terminal device from another network entity; and a controller unit configured to determine an indication of an altitude of the terminal device from the indication of barometric pressure measured by the terminal device and the calibration information received from the other network entity.

Paragraph 27. Circuitry for a terminal device comprising a controller element and a transceiver element configured to operate together to: obtain an indication of a measurement of barometric pressure made by the terminal device; receive calibration information for the indication of the measurement of barometric pressure made by the terminal device from another network entity; and determine an indication of an altitude of the terminal device from the indication of a measurement of barometric pressure made by the terminal device and the calibration information received from the other network entity.

Paragraph 28. A method of operating a base station in a wireless telecommunications network to determine an altitude for a terminal device; the method comprising: receiving from the terminal device an indication of a measurement of barometric pressure made by the terminal device; establishing calibration information for the indication of the measurement of barometric pressure made by the terminal device; and determining an indication of an altitude of the terminal device from the indication of the measurement of barometric pressure made by the terminal device and the calibration information established by the base station.

Paragraph 29. A base station comprising: a transceiver unit configured to receive from a terminal device an indication of a measurement of barometric pressure made by the terminal device; a calibration information generation unit configured to establish calibration information for the indication of the measurement of barometric pressure made by the terminal device; and a controller unit configured to determine an indication of an altitude of the terminal device from the indication of the measurement of barometric pressure made by the terminal device and the calibration information established by the base station.

Paragraph 30. Circuitry for a base station comprising a controller element and a transceiver element configured to operate together to: receive from the terminal device an indication of a measurement of barometric pressure made by the terminal device; establish calibration information for the indication of the measurement of barometric pressure made by the terminal device; and determine an indication of an altitude of the terminal device from the indication of the measurement of barometric pressure made by the terminal device and the calibration information established by the base station.

REFERENCES

[1] FCC publication FCC-14-13, Wireless E911 Location Accuracy Requirements, Adopted: Feb. 20, 2014 Released: Feb. 21, 2014—https://apps.fcc.gov/edocs_public/attachmatch/FCC-14-13A1.pdf [1])
[2] Holma H. and Toskala A, "LTE for UMTS OFDMA and SC-FDMA based radio access", John Wiley and Sons, 2009.

[3] BMP180 digital barometric pressure sensor from Bosch Sensortec—http://www.bosch-sensortec.com/en_GB/homepage/products_3/environmental_sensors_1/bmp180_1/bmp180

[4] BMP280 barometric pressure sensor from Bosch Sensortec—http://www.bosch-sensortec.com/en) GB/homepage/products_3/environmental_sensors_1/bmp280/bmp280

[5] BME280 integrated environmental sensor from Bosch Sensortec—http://www.bosch-sensortec.com/en_GB/homepage/products_3/environmental_sensors_1/bme280/bme280_1

What is claimed is:

1. A method of determining an altitude of a terminal device operating in a wireless telecommunications network comprising the terminal device and another network entity, the method comprising:
    measuring, by the terminal device, an indication of barometric pressure in the vicinity of the terminal device;
    establishing, at the other network entity, calibration information for the indication of barometric pressure measured at the terminal device, wherein the other network entity is another terminal device and the calibration is the another terminal device's own pressure measurements;
    determining, at the terminal device, the altitude of the terminal device from the indication of barometric pressure measured by the terminal device and the calibration information established at the other network entity, the altitude being relative only to the another terminal device; and
    transmitting the altitude relative to the another terminal device to the another terminal device, the another terminal device being configured to locate the terminal device relative to its own location.

2. The method of claim 1, further comprising the other network entity forwarding an indication of the determined altitude to another element of the wireless telecommunications network.

3. The method of claim 1, wherein the indication of the calibration information is conveyed to the terminal device in broadcast signalling transmitted by the other network entity.

4. The method of claim 3, wherein the indication of the calibration information is conveyed to the terminal device in association with network information transmitted by the other network entity.

5. The method of claim 1, further comprising the terminal device receiving an indication of further calibration information established by at least one further other network entity, and wherein the altitude of the terminal device is determined by the terminal device using the further calibration information received from the at least one further other network entity.

6. The method of claim 5, wherein the step of determining the altitude of the terminal device takes account of the relative distances between the terminal device and the other network entity and between the terminal device and the at least one further other network entity.

7. The method of claim 6, further comprising determining the relative distances between the terminal device and the other network entity and further other network entity from one or more of signal strengths and signal propagation delays associated with signalling between the terminal device and the respective network entities.

8. The method of claim 1, further comprising the terminal device conveying an indication of barometric pressure measured by the terminal device to the other network entity, and wherein the other network entity performs the step of determining the altitude of the terminal device from the indication of barometric pressure measured by the terminal device and the calibration information established at the other network entity.

9. The method of claim 8, further comprising the other network entity conveying an indication of the determined altitude to the terminal device.

10. The method of claim 8, further comprising the other network entity forwarding an indication of the determined altitude to another element of the wireless telecommunications network.

11. The method of claim 1, wherein the calibration information comprises an indication of a reference barometric pressure for a reference altitude.

12. The method of claim 11, wherein the altitude of the terminal device is determined relative to the reference altitude from a difference between the indication of the barometric pressure measured by the terminal device and the indication of the reference barometric pressure.

13. The method of claim 11, wherein the altitude of the terminal device relative to the reference altitude is determined by comparing the difference between the indication of the barometric pressure measured by the terminal device and the indication of the reference barometric pressure with a model of variations in barometric pressure with altitude.

14. The method of claim 11, wherein the indication of the reference barometric pressure comprises an indication of barometric pressure in the vicinity of the other network entity.

15. The method of claim 14, wherein the indication of barometric pressure in the vicinity of the other network entity is an indication of barometric pressure measured by the other network entity.

16. The method of claim 14, wherein reference altitude is an altitude of the other network entity.

17. The method of claim 11, further comprising the other network entity obtaining meteorological data for a region containing the terminal device and an indication of a horizontal position for the terminal device within the region, and wherein the indication of the reference barometric pressure comprises an indication of barometric pressure in the vicinity of the terminal device for the reference altitude which is established by the other network entity from the meteorological data.

18. The method of claim 1, further comprising the terminal device establishing an indication of its horizontal position and conveying the indication of its horizontal position to the other network entity.

19. The method of claim 1, wherein the indication of the terminal device's horizontal position is determined using one or more of a GPS receiver unit and one or more of a wireless local area network transceiver unit and a Bluetooth transceiver unit.

20. A method of operating a terminal device in a wireless telecommunications network to determine an altitude for the terminal device; the method comprising:
    measuring an indication of barometric pressure at the terminal device;
    receiving calibration information for the indication of barometric pressure measured at the terminal device from another network entity, wherein the other network entity is another terminal device and the calibration information is the another terminal device's own pressure measurements;
    determining the altitude of the terminal device from the indication of barometric pressure measured at the terminal device and the calibration information received from the other network entity, the altitude being relative only to the another terminal device; and transmitting the altitude relative to the another terminal device to the another terminal device, the another terminal device being configured to locate the terminal device relative to its own location.

21. A terminal device comprising:

a pressure sensor configured to measure an indication of barometric pressure;

a transceiver configured to receive calibration information for the indication of barometric pressure measured by the terminal device from another network entity, wherein the other network entity is another terminal device and the calibration information is the another terminal device's own pressure measurements;

circuitry configured to determine an indication of an altitude of the terminal device from the indication of barometric pressure measured by the terminal device and the calibration information received from the other network entity, the altitude being relative only to the another terminal device, and transmit the altitude relative to the another terminal device to the another terminal device, the another terminal device being configured to locate the terminal device relative to its own location.

22. Circuitry for a terminal device comprising a controller element and a transceiver element configured to operate together to:

obtain an indication of a measurement of barometric pressure made by the terminal device;

receive calibration information for the indication of the measurement of barometric pressure made by the terminal device from another network entity, wherein the other network entity is another terminal device and the calibration information is the another terminal device's own pressure measurements;

determine an indication of an altitude of the terminal device from the indication of a measurement of barometric pressure made by the terminal device and the calibration information received from the other network entity, the altitude being relative only to the another terminal device; and transmit the altitude relative to the another terminal device to the another terminal device, the another terminal device being configured to locate the terminal device relative to its own location.

* * * * *